(12) United States Patent
Rimet

(10) Patent No.: US 8,007,207 B2
(45) Date of Patent: Aug. 30, 2011

(54) CUTTING TOOL WITH REPLACEABLE INSERT SUPPORTING CASSETTE

(75) Inventor: Lilian Rimet, Saint Sauveur (FR)

(73) Assignee: Seco Tools AB, Fagersta (SE)

( * ) Notice: Subject to any disclaimer, the term of this patent is extended or adjusted under 35 U.S.C. 154(b) by 234 days.

(21) Appl. No.: 12/058,890

(22) Filed: Mar. 31, 2008

(65) Prior Publication Data

US 2008/0240872 A1 Oct. 2, 2008

(30) Foreign Application Priority Data

Mar. 30, 2007 (SE) .................................... 0700859

(51) Int. Cl.
B23C 5/24 (2006.01)
B23C 5/22 (2006.01)

(52) U.S. Cl. ............................ 407/46; 407/40; 407/101

(58) Field of Classification Search .................... 407/11, 407/34–37, 40, 43–46, 49, 107
See application file for complete search history.

(56) References Cited

U.S. PATENT DOCUMENTS

| | | | | |
|---|---|---|---|---|
| 2,553,151 A | * | 5/1951 | Sharp | 407/108 |
| 3,303,728 A | * | 2/1967 | Testa | 408/197 |
| 3,644,050 A | | 2/1972 | Schiller | |
| 3,701,187 A | * | 10/1972 | Erkfritz | 407/46 |
| 3,755,868 A | | 9/1973 | LaForge et al. | 407/75 |
| 4,318,647 A | * | 3/1982 | Erkfritz | 408/153 |
| 4,580,929 A | * | 4/1986 | Gehri | 407/37 |
| 4,880,339 A | * | 11/1989 | Doge | 408/161 |
| 4,964,763 A | | 10/1990 | Kieniger | |
| 5,120,166 A | * | 6/1992 | Woerner | 407/12 |
| 5,320,458 A | | 6/1994 | Reiterman et al. | |
| 5,567,092 A | * | 10/1996 | Post | 407/38 |
| 5,667,343 A | * | 9/1997 | Hessman et al. | 407/36 |
| 5,676,505 A | * | 10/1997 | Gauss et al. | 409/132 |
| 5,868,529 A | * | 2/1999 | Rothballer et al. | 407/36 |
| 6,056,484 A | * | 5/2000 | Mitchell et al. | 407/36 |
| 6,971,823 B2 | * | 12/2005 | Satran et al. | 407/46 |
| 7,118,311 B2 | * | 10/2006 | Astrom | 407/46 |

(Continued)

FOREIGN PATENT DOCUMENTS

DE 3530745 A * 3/1987
EP 0376204 A2 7/1990

OTHER PUBLICATIONS

International Search Report for corresponding International Application PCT/SE2008/050319.

*Primary Examiner* — Boyer D Ashley
*Assistant Examiner* — Sara Addisu
(74) *Attorney, Agent, or Firm* — WRB-IP LLP

(57) ABSTRACT

A cutting tool includes a cutting insert, the insert including a cutting edge. The cutting tool also includes a cassette including an insert clamp for clamping the insert relative to an abutment surface of the cassette, and a generally cylindrical base portion. The cutting tool also includes a tool holder body, the tool holder body having a cylindrical opening in which the base portion of the cassette is disposed. A cassette clamp including a wedge is provided for clamping the cassette relative to the tool holder body. The cutting edge extends beyond a periphery of the tool holder body when the insert is clamped relative to the abutment surface of the cassette and the cassette is clamped relative to the tool holder body.

16 Claims, 4 Drawing Sheets

U.S. PATENT DOCUMENTS

| | | | |
|---|---|---|---|
| 7,326,009 B2 * | 2/2008 | Lindblom | 408/59 |
| 7,393,163 B2 * | 7/2008 | Edvardsson et al. | 408/230 |
| 7,445,410 B2 * | 11/2008 | Abramson et al. | 408/154 |
| 7,549,824 B2 * | 6/2009 | Agic | 407/42 |
| 7,611,313 B2 * | 11/2009 | Hyatt et al. | 409/132 |
| 2002/0081168 A1 * | 6/2002 | Kress | 408/179 |
| 2005/0166727 A1 * | 8/2005 | Peltonen et al. | 82/1.11 |
| 2008/0240880 A1 * | 10/2008 | Durand | 409/131 |

* cited by examiner

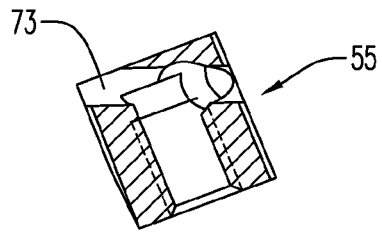
FIG. 3B
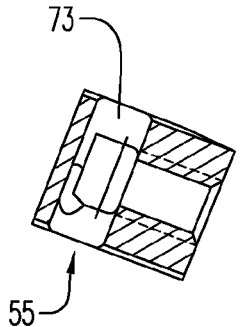
FIG. 3C
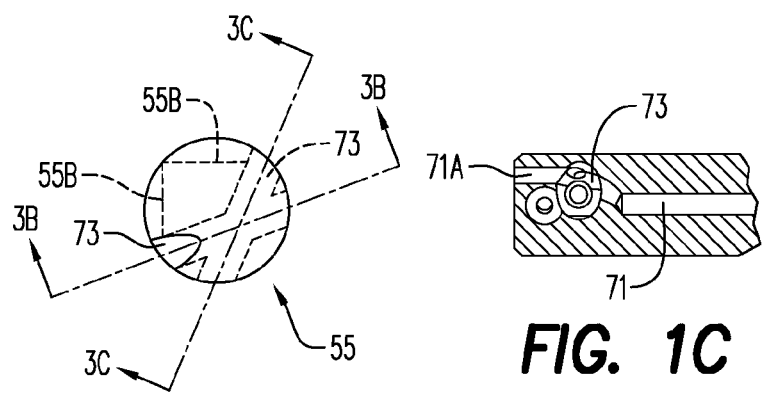
FIG. 3A
FIG. 1C
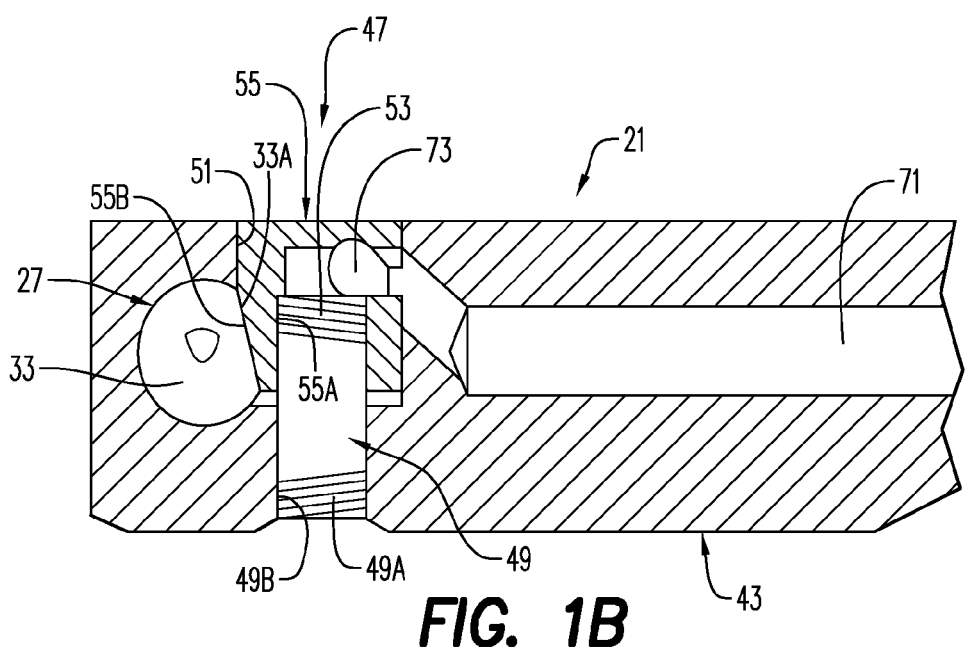
FIG. 1B

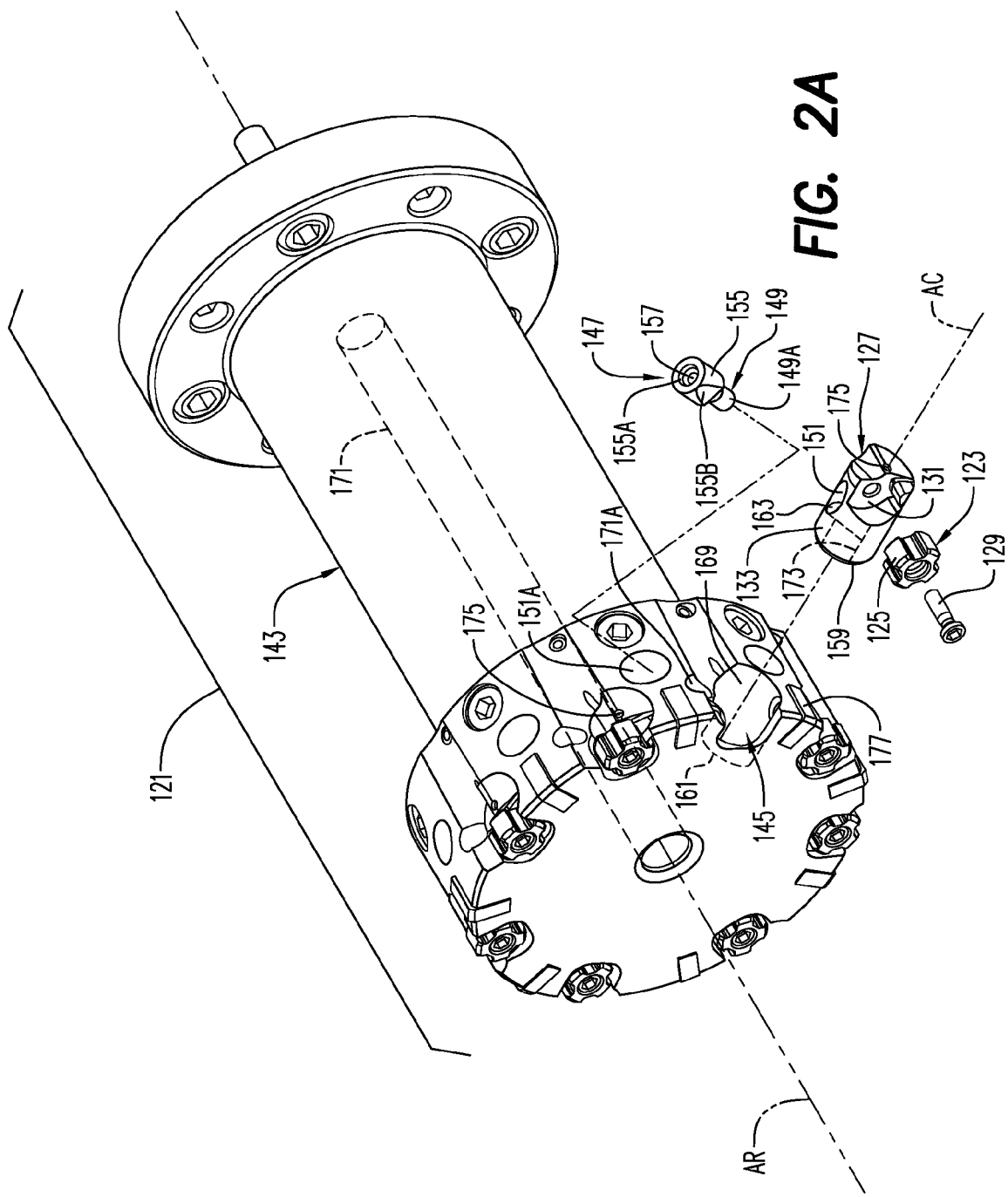

CUTTING TOOL WITH REPLACEABLE INSERT SUPPORTING CASSETTE

BACKGROUND AND SUMMARY

The present invention relates generally to cutting tools and, more particularly, to cutting tools having insert supporting cassettes.

In most cutting tools having replaceable cutting inserts, a cutting insert is mounted in a recess in a tool holder body and is clamped to an abutment surface by a clamp such as a screw extending through a hole in the insert into an internally threaded hole in the tool holder body. The abutment surface may be part of the tool holder body itself, or an intermediate structure such as a shim that is itself clamped to a surface formed in a recess formed on the tool holder body. In either event, design of a tool holder body is complicated when it is desired to position the insert so that a working cutting edge of the insert defines a certain angle with a longitudinal axis of the tool holder body, and so that rake and relief surfaces of the insert are properly oriented relative to the tool holder body. Once the design is completed, machining of the insert-receiving recesses in the tool holder body is likewise complicated. The finished tool holder body generally has a single function such as, for rotating tools, for example, being adapted to bore an opening having a particular diameter.

It is desirable to provide a cutting tool in which the design and machining of the tool holder body can be simplified. It is also desirable to provide a cutting tool that is more flexible in application than conventional cutting tools.

In accordance with an aspect of the present invention, a cutting tool comprises a cutting insert, the insert comprising a cutting edge, a cassette comprising an insert clamp for clamping the insert relative to an abutment surface of the cassette, and a generally cylindrical base portion, a tool holder body, the tool holder body having a cylindrical opening in which the base portion of the cassette is disposed, and a cassette clamp comprising a wedge for clamping the cassette relative to the tool holder body, the cutting edge extending beyond a periphery of the tool holder body when the insert is clamped relative to the abutment surface of the cassette and the cassette is clamped relative to the tool holder body.

In accordance with another aspect of the present invention, a cassette adapted to be mounted relative to a cutting tool comprises a body comprising an abutment surface to which an insert is adapted to be clamped by an insert clamp and a generally cylindrical base portion receivable in a cylindrical opening in a tool holder body. The abutment surface comprises an internally threaded opening for receiving a screw of the insert clamp, the internally threaded opening being substantially parallel to a longitudinal axis of at least one of the cassette and the tool holder body.

BRIEF DESCRIPTION OF THE DRAWINGS

The features and advantages of the present invention are well understood by reading the following detailed description in conjunction with the drawings in which like numerals indicate similar elements and in which:

FIGS. 1B and 1C are side, partially cross-sectional views of embodiments of a cutting tool of the general type shown in FIG. 1A;

FIG. 2A is a perspective, partially exploded view of a cutting tool according to another embodiment of the present invention.

FIG. 3A is a top view of a wedge according to an embodiment of the present invention, and FIGS. 3B and 3C are cross-sectional views of the wedge of FIG. 3A at sections 3B-3B and 3C-3C, respectively.

DETAILED DESCRIPTION

Figure 1A:
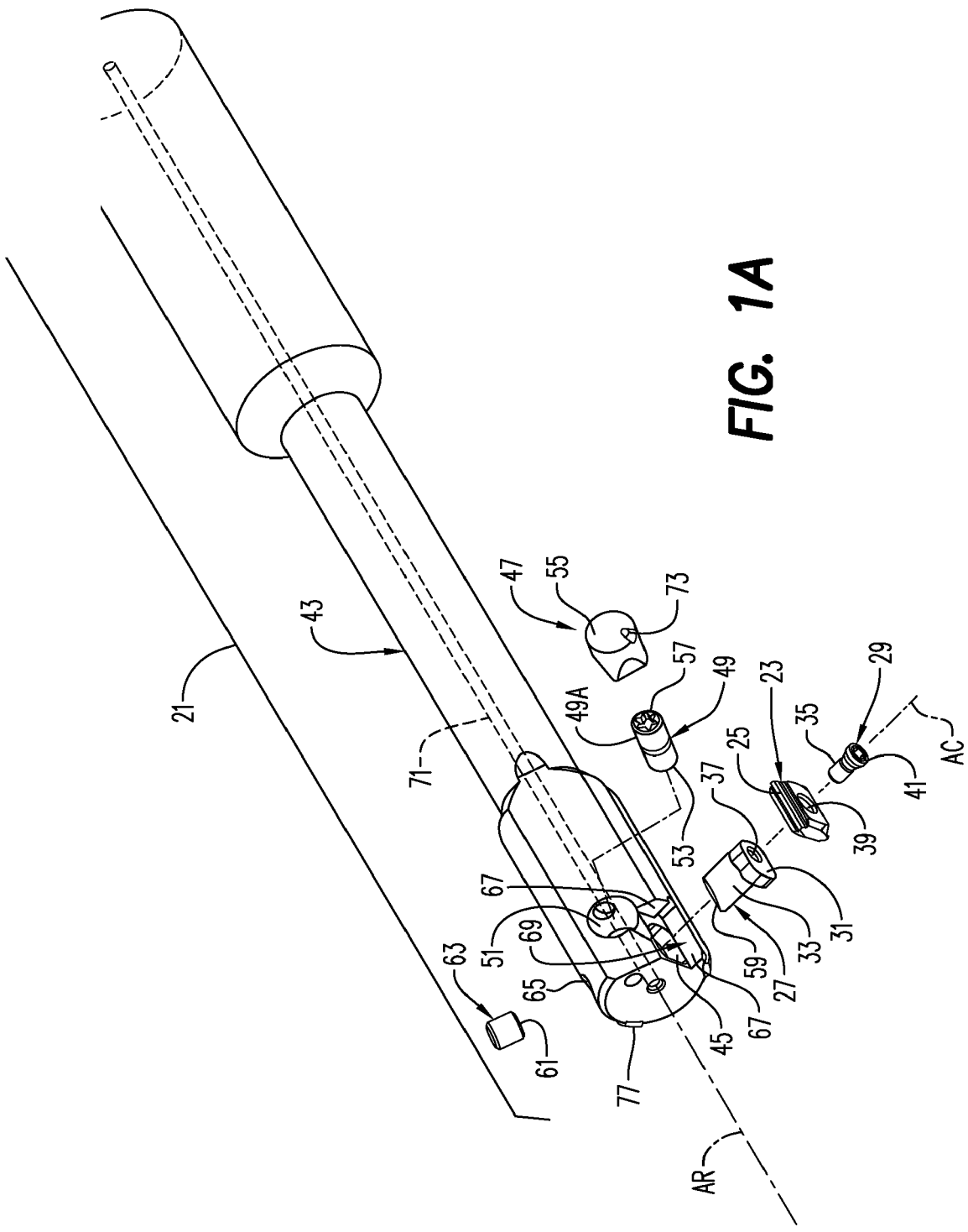
FIG. 1A is a perspective, exploded view of a cutting tool according to an embodiment of the present invention.

A cutting tool 21 according to an embodiment of the present invention is shown in FIG. 1A. The cutting tool 21 comprises a cutting insert 23 and the insert comprising a cutting edge 25. The particular cutting insert 23 shown in FIG. 1A is indexable, meaning that it can be moved to different positions relative to the cutting tool 21 to expose a different cutting edge 25, however, it will be appreciated that the cutting insert need not be of the indexable type. An insert such as the insert 23 shown in FIG. 1A has two cutting edges 25 on opposite sides of the insert and can be indexable to at least two positions. If it is of the type that is further indexable so that it can be turned over to expose additional cutting edges, it can be indexed to four positions. An insert 123 such as is shown in FIG. 2A has eight cutting edges 125, i.e., is indexable to eight different positions. The insert 123 is described in more detail in commonly assigned Application No. SE 0700860-0 which is incorporated by reference. The tool illustrated in FIG. 1A (and the tool illustrated in FIG. 2A, as well) is a reaming tool, however, it will be appreciated that the present invention is not necessarily limited to applications involving reaming tools, and can have application in all manner of rotating and turning tools.

The cutting tool 21 also comprises a cassette 27 comprising an insert clamp 29 for clamping the insert 23 relative to an abutment surface 31 of the cassette. The cassette 27 also comprises a generally cylindrical base portion 33. The insert clamp 29 is ordinarily in the form of a screw having an external thread 35 that mates with an internally threaded opening 37 in the abutment surface 31. The screw extends through a hole 39 in the insert 23 and a head 41 of the screw urges the insert against the abutment surface 31. Other types of clamps for clamping cutting inserts relative to abutment surfaces are known and can be used instead of a screw-type clamp.

The cutting tool 21 also comprises a tool holder body 43. The tool holder body 43 has a cylindrical opening 45 in which the base portion 33 of the cassette 27 is disposed. A cassette clamp 47 is provided for clamping the cassette 27 relative to the tool holder body 43. The cutting edge 25 extends beyond a periphery of the tool holder body 43 when the insert 23 is clamped relative to the abutment surface 31 of the cassette 27 and the cassette is clamped relative to the tool holder body. In the embodiment shown in FIGS. 1A-1B, the cassette clamp 47 comprises a screw 49 having an external thread 49A that mates with an internal thread 49B in a hole 51 extending through the tool holder body 43. An opposite end 53 of the screw 49 is threaded in an opposite direction from the external thread 49A and mates with an internal thread 55A in a clamping wedge 55. When the screw 49 is tightened in the hole 51, the clamping wedge 55 is drawn into the hole and a flat surface 55B thereof abuts a flat surface 33A of the cylindrical base 33 of the cassette 27 to restrict rotation of the cassette relative to the tool holder body 43 and to assist in retaining the cassette it in the cylindrical opening 45 by friction.

Figure 2B:
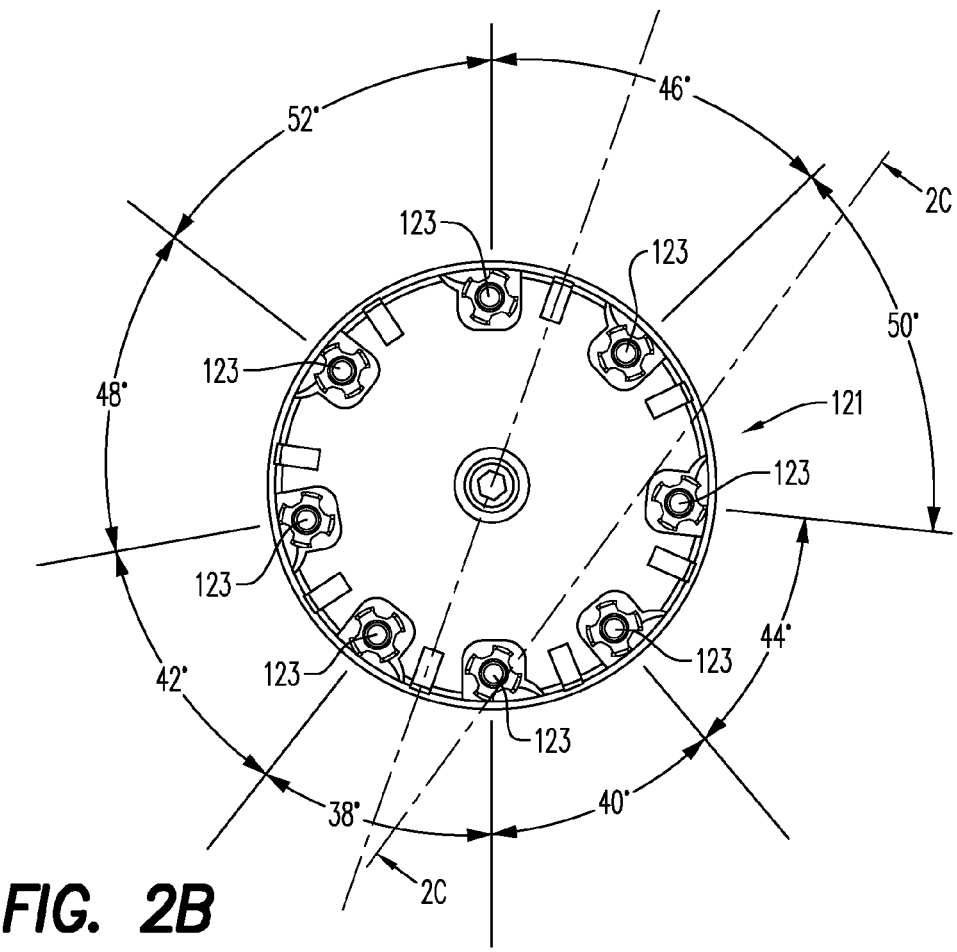
FIG. 2B is an end view of a cutting tool of the general type shown in FIG. 2A.
Figure 2C:
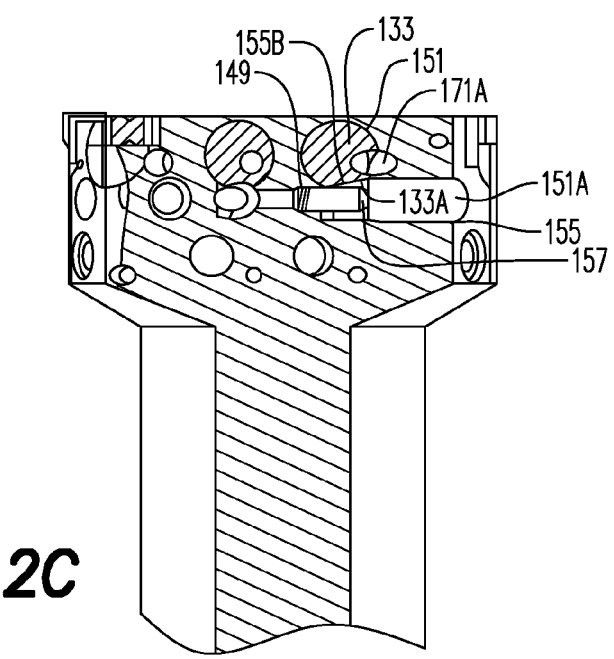
FIG. 2C is a partially cross-sectional view taken at section 2C-2C of FIG. 2B.

As seen in an alternative embodiment in FIGS. 2A and 2C, the clamping wedge 155 has an internally threaded through hole 155A through which a screw 149 of the cassette clamp 147 extends and with which an external thread proximate a head 157 of the screw mates. Another external thread 149A at the opposite end of the screw 149 is threaded in an opposite direction than the thread at the head 157 of the screw and mates with an internal thread in the hole 151A in the tool holder body 143. A tool (not shown) such as a screwdriver or Allen wrench at the head 157 of the screw 149 can tighten the external thread 149A of the screw in the internal thread in the hole 151A and, at the same time, the external thread proximate the head 157 of the screw that mates with the internal thread in the hole 155A in the wedge 155 and the wedge are drawn into the hole 151A. A flat surface 155B of the wedge is moved into contact with a flat surface 133A of the cylindrical base 133 of the cassette 127 to prevent rotation of the cassette relative to the tool holder body 143 and to assist in retaining the cassette in the opening 145 by friction. It will be appreciated that the surfaces 55B and 155B of the wedges 55 and 155 need not be flat and may have some other shape, such as curved, for contacting correspondingly shaped surfaces 33A and 133A on the bases of the cassettes 27 and 127, however, it is desirable for the wedges to be wedge-shaped to facilitate clamping.

In the embodiment shown in FIG. 1A, the tool 21 is a rotatable tool and a longitudinal axis AC of the cassette 27 is substantially perpendicular to an axis of rotation AR of the tool. In this embodiment, the longitudinal axis AC of the cassette 27 substantially intersects the axis of rotation AR of the tool 21. It will be appreciated that the tool need not necessarily be a rotatable tool, that the longitudinal axis of the cassette need not be perpendicular to the axis of rotation of the tool, and that the longitudinal axis of the cassette need not intersect the axis of rotation of the tool. However, tool design operations can be simplified when such relationships are provided, as the position of the insert 23 relative to the tool holder body 43 can be controlled by appropriate formation of the abutment surface 31 on the cassette 27. For example, in FIG. 1A, the abutment surface 31 of the cassette 27 is shown as defining an angle of about 0° with a plane perpendicular to the longitudinal axis AC of the cassette while, in FIG. 2A, the abutment surface 131 of the cassette 127 defines an angle of about 0° with a longitudinal axis AC of the cassette.

The abutment surfaces 31 and 131 can be angled substantially from the angles relative to the perpendicular to the longitudinal axis of the cassette or relative to the longitudinal axis of the cassette that are illustrated. For example, the abutment surface 31 can be changed from the illustrated angle of about 0° with a plane perpendicular to the longitudinal axis AC of the cassette 27 to an angle of about 90° with that plane, which may be to a position like that of the abutment surface 131. Similarly, the abutment surface 131 can be changed from the illustrated angle of about 0° with the longitudinal axis of the cassette to a position that is about 90° to that axis, which may be a position like that of the abutment surface 31. The abutment surface may, of course, be changed to still some other orientation relative to the cassette than the illustrated embodiments. While reference is made herein to abutment surfaces 31 and 131 that are shown as being substantially flat and planar, it will be appreciated that these surfaces need not be flat and planar and can be in any suitable form, such as curved, grooved, or otherwise shaped. The point is simply that positioning of the insert relative to the tool holder body can be achieved largely through forming or machining of a replaceable, possibly adjustable cassette rather than by machining of a larger block for forming the tool holder body.

In the embodiment of the tool 121 shown in FIG. 2A, a bottom end 159 of the cassette 127 abuts a fixed surface 161 (shown in phantom) in the cylindrical opening 145 for the cylindrical base portion 133 of the cassette 131. In the embodiment of the tool 21 shown in FIG. 1A, a bottom end 59 of the cassette 27 abuts an adjustably movable surface 61 in the cylindrical opening 45. The movable surface 61 can be part of a set screw 63 that can be screwed into an internally threaded hole 65 in the tool holder body 43 on substantially the opposite side of the tool holder body from the cylindrical opening 45 so the surface 61 is disposed at the bottom of the cylindrical opening. By adjusting the position of the set screw 63 and the movable surface 61, the position of the cutting insert 23 relative to the tool holder body 43 can be adjusted. Ordinarily the position of the cutting insert 23 relative to the tool holder body 43 will be adjusted to adjust a diameter of a hole to be machined in a workpiece. The bottom end 59 of the cassette 27 can be formed at an angle to a plane perpendicular to the axis AC of the cassette, which may be useful, for example, to provide the hole 65 in a thicker part of the tool holder body 43 than if the hole were aligned with the axis of the cassette. In the tool 121 shown in FIG. 2A, the bottom end 159 of the cassette 127 may abut a movable surface (not shown) as in the embodiment of FIG. 1A. Likewise, in the tool 21 shown in FIG. 1A, the bottom end 59 of the cassette 27 may abut a fixed surface.

Referring to the tool 21 for purposes of discussion, the tool will ordinarily be provided with one or more abutment surfaces 67 for preventing rotation of the cutting insert 23 relative to the tool holder body 43, e.g., around an axis of a screw forming the insert clamp 29. Ordinarily, the tool 21 has a recess 69 formed in the tool holder body 43 to receive the insert 23 and walls of the recess form the abutment surfaces 67. However, as seen in FIG. 2A, an abutment surface 167 can be provided on the cassette 127. In the recess 169 provided on the embodiment of FIG. 2A, the walls of the recess do not form abutment surfaces.

As illustrated in FIG. 2A, but applicable as well to embodiments such as illustrated in FIG. 1A, a body channel 171 (shown in phantom) can be provided to extend at least partially through the tool holder body 143, and a cassette channel 173 (shown in phantom) can be provided in the cassette 127 and lead to an opening 151 on the cassette. The body channel 171 and the cassette channel 173 can be in flow communication when the cassette 127 is mounted in the tool holder body 143 and can be used, for example, for introducing flushing/lubricating/cooling fluid to the workpiece. A further portion 171A of the body channel 171 may communicate with the opening 151 to facilitate introducing fluid. The opening 151 may have internal threads (not shown) for mating with external threads of a set screw 163 to facilitate adjusting the radial position of the cassette 127 and, thus, the insert 123.

A body channel 71 (shown in phantom) can extend at least partially through the tool holder body 43, and a wedge channel 73 can be provided in the wedge 55. The body channel 71 and the wedge channel 73 can be in flow communication when the wedge 55 is disposed in the wedge-receiving opening 51 and can be used, for example, for introducing flushing/lubricating/cooling fluid to the workpiece. The wedge channel 73 can be provided as a conduit to a further portion of the body channel 71A as seen in FIG. 1C so that fluid can be introduced at an end of the body 43, or, as seen in FIGS. 1A and 1B, the wedge channel can be provided so that fluid is introduced through the wedge, i.e., in a more or less radial direction. As seen in FIGS. 3A-3C, wedge 55 can be provided with two flat surfaces 55B so that the wedge can be disposed in the hole 51 with one of the flat surfaces abutting the flat surface 33A on the base 33 of the cassette 27 in either of two orientations of the wedge. When the wedge 55 is oriented in a first orientation, fluid can flow from the body channel 71 into the wedge channel 73 and out the top of the wedge by the hole 51. When the wedge 55 is oriented in a second orientation, fluid can flow from the body channel 71 into the wedge channel 73 and into the body channel 71A. The cutting tools 21 and 121 are also shown with reference pads 77 and 177 to assist in ensuring proper positioning of the cutting tool and its insert(s) by avoiding excessively large circumferential distances between cutting edges.

As seen in FIG. 2A, a cutting tool 121 can comprise plurality of cassettes 127, each of the plurality of cassettes having a base 133 adapted to be received in a respective one of a corresponding plurality of openings 145 in the tool holder body 143. A corresponding plurality of inserts 123 can be clamped to a respective one of the plurality of cassettes 127 by respective insert clamps 129 such as screws. As seen in FIG. 2B, the inserts 123 can be mounted at different angular spacings relative to each other, which can facilitate avoiding potentially harmful vibrations. While FIGS. 1A and 2A illustrate embodiments with only one insert on each cassette, it will be appreciated that multiple inserts can be provided on a single cassette.

The bases 33 and 133 of the cassettes 27 and 127, respectively, can be provided with a tapered shape to facilitate properly orienting the cutting edges 25 and 125 of the cutting inserts 23 and 123. The taper may be rather minimal, for example, on the cassette 127, the base 133 may taper from a diameter of approximately 12.00 mm proximate the abutment surface 131 to a diameter of approximately 11.95 mm proximate the bottom end 159. For example, the bases 33 and 133 may be smallest proximate the bottom end 59 and 159 of the cassettes 27 and 127 and, when the wedges 55 and 155 are moved in the holes 51 and 151A, respectively, so that the surfaces 55B and 155B of the wedges contact the surfaces 33A and 133A of the bases of the cassettes and, when the wedges are fully seated, they tilt the abutment surface 31 and 131 of the cassette—and, thus, the cutting edges 25, 125 of the cutting inserts 23, 123 on the abutment surfaces—to a desired angle. Thus, through the present invention, radial positioning of the inserts 23 and 123 relative to the axis of rotation AR of the tool 21 and 121 can be accomplished by appropriate adjustment of set screws 63 and 163, respectively, and the angular orientation or "back taper" of the cutting inserts 23 and 123 and cutting edges 25 and 125 thereof relative to the tool can be accomplished by appropriate adjustment of the positions of the wedges 55 and 155.

While the present invention has been described primarily in conjunction with rotating tools, such as drilling, boring, and milling tools, it will be appreciated that the present invention has other applications, as well, such as in conjunction with other forms of tools, such as turning tools.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application Nos. 0700859-2 and 0700860-0, from which this application claims priority, are incorporated herein by reference.

While this invention has been illustrated and described in accordance with a preferred embodiment, it is recognized that variations and changes may be made therein without departing from the invention as set forth in the claims.

What is claimed is:

1. A cutting tool, comprising:
a cutting insert, the insert comprising a cutting edge;
a cassette comprising an insert clamp for clamping the insert relative to an abutment surface of the cassette, and a generally cylindrical base portion;
a tool holder body, the tool holder body having a cylindrical opening in which the base portion of the cassette is disposed; and
a cassette clamp comprising a wedge for clamping the cassette relative to the tool holder body, the cutting edge extending beyond a periphery of the tool holder body when the insert is clamped relative to the abutment surface of the cassette and the cassette is clamped relative to the tool holder body, the wedge being adapted to be received in a wedge-receiving opening in the tool holder body, wherein the cassette clamp comprises a screw and the wedge, the screw being disposed in a hole in the wedge and being threaded into an internally threaded hole in the tool holder body, and wherein the tool is a rotatable tool and a longitudinal axis of the cassette is substantially perpendicular to an axis of rotation of the tool.

2. The cutting tool as set forth in claim 1, wherein the longitudinal axis of the cassette substantially intersects the axis of rotation of the tool.

3. The cutting tool as set forth in claim 1, wherein a bottom end of the cassette abuts a fixed surface in the cylindrical opening.

4. The cutting tool as set forth in claim 2, wherein the abutment surface of the cassette defines an angle of 0°-90° with a plane perpendicular to a longitudinal axis of the cassette.

5. The cutting tool as set forth in claim 1, wherein the abutment surface of the cassette defines an angle of 0°-90° with a longitudinal axis of the cassette.

6. The cutting tool as set forth in claim 1, comprising an abutment surface for preventing rotation of the cutting insert relative to the tool holder body.

7. The cutting tool as set forth in claim 6, wherein the abutment surface is at least partially defined by a surface of the tool holder body.

8. The cutting tool as set forth in claim 6, wherein the abutment surface is at least partially defined by a surface of the cassette.

9. The cutting tool as set forth in claim 1, wherein the insert is indexable to at least two positions.

10. The cutting tool as set forth in claim 1, comprising a plurality of cassettes, each of the plurality of cassettes having a base adapted to be received in a respective one of a corresponding plurality of openings in the tool holder body, and a corresponding plurality of inserts clamped to a respective one of the plurality of cassettes.

11. The cutting tool as set forth in claim 1, wherein the insert clamp comprises a screw having a longitudinal axis that is substantially parallel to a longitudinal axis of at least one of the cassette and the tool holder body.

12. The cutting tool as set forth in claim 1, wherein the wedge abuts a tapered surface of the base of the cassette and, when the wedge is in a fully seated position relative to the tapered surface, the cutting edge is in a predetermined angular orientation relative to the tool holder body.

13. A cutting tool, comprising:
a cutting insert, the insert comprising a cutting edge;
a cassette comprising an insert clamp for clamping the insert relative to an abutment surface of the cassette, and a generally cylindrical base portion, the insert clamp being disposed at a top end of the cassette and a bottom end of the cassette being disposed at an opposite end of the cassette from the top end;

a tool holder body, the tool holder body having a cylindrical opening in which the base portion of the cassette is disposed; and a cassette clamp comprising a wedge for clamping the cassette relative to the tool holder body, the cutting edge extending beyond a periphery of the tool holder body when the insert is clamped relative to the abutment surface of the cassette and the cassette is clamped relative to the tool holder body, wherein a bottom end of the cassette abuts an adjustably movable surface at least partially defining a bottom of the cylindrical opening, the adjustably movable surface being adjustable to permit clamping of the cassette in different positions relative to the tool holder body when the bottom end of the cassette abuts the adjustably movable surface in the cylindrical opening.

14. The cutting tool as set forth in claim 13, wherein the adjustably movable surface is defined by an end of an adjusting screw movably disposed in a threaded hole in the tool holder body.

15. A cutting tool, comprising:

a cutting insert, the insert comprising a cutting edge;

a cassette comprising an insert clamp for clamping the insert relative to an abutment surface of the cassette, and a generally cylindrical base portion;

a tool holder body, the tool holder body having a cylindrical opening in which the base portion of the cassette is disposed;

a cassette clamp comprising a wedge for clamping the cassette relative to the tool holder body, the cutting edge extending beyond a periphery of the tool holder body when the insert is clamped relative to the abutment surface of the cassette and the cassette is clamped relative to the tool holder body, the wedge being adapted to be received in a wedge-receiving opening in the tool holder body, wherein the cassette clamp comprises a screw and the wedge, the screw being disposed in a hole in the wedge and being threaded into an internally threaded hole in the tool holder body; and a body channel extending at least partially through the tool holder body, and a cassette channel disposed in the cassette, the body channel and the cassette channel being in flow communication when the cassette is mounted in the tool holder body.

16. A cutting tool, comprising:

a cutting insert, the insert comprising a cutting edge;

a cassette comprising an insert clamp for clamping the insert relative to an abutment surface of the cassette, and a generally cylindrical base portion;

a tool holder body, the tool holder body having a cylindrical opening in which the base portion of the cassette is disposed;

a cassette clamp comprising a wedge for clamping the cassette relative to the tool holder body, the cutting edge extending beyond a periphery of the tool holder body when the insert is clamped relative to the abutment surface of the cassette and the cassette is clamped relative to the tool holder body, the wedge being adapted to be received in a wedge-receiving opening in the tool holder body, wherein the cassette clamp comprises a screw and the wedge, the screw being disposed in a hole in the wedge and being threaded into an internally threaded hole in the tool holder body; and a body channel extending at least partially through the tool holder body, and a wedge channel disposed in the wedge, the body channel and the wedge channel being in flow communication when the wedge is disposed in the wedge-receiving opening.

* * * * *